United States Patent
Kolati et al.

(10) Patent No.: US 11,876,840 B2
(45) Date of Patent: Jan. 16, 2024

(54) METHOD AND APPARATUS FOR CONTROLLING STREAMING OF MULTIMEDIA DATA IN A NETWORK

(71) Applicant: SAMSUNG ELECTRONICS CO., LTD., Suwon-si (KR)

(72) Inventors: Naveen Kolati, Bangalore (IN); Rathnamaiah Gundai, Bangalore (IN); Siva Prasad Gundur, Bangalore (IN); Vinayak Goyal, Bangalore (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/260,070

(22) PCT Filed: Sep. 11, 2019

(86) PCT No.: PCT/KR2019/011817
§ 371 (c)(1),
(2) Date: Jan. 13, 2021

(87) PCT Pub. No.: WO2020/055155
PCT Pub. Date: Mar. 19, 2020

(65) Prior Publication Data
US 2022/0094725 A1    Mar. 24, 2022

(30) Foreign Application Priority Data
Sep. 12, 2018 (IN) .............................. 201811034424
Sep. 10, 2019 (IN) .............................. 201811034424

(51) Int. Cl.
H04L 65/1089 (2022.01)
H04L 65/403 (2022.01)
(Continued)

(52) U.S. Cl.
CPC ........ *H04L 65/1089* (2013.01); *H04L 65/403* (2013.01); *H04L 65/61* (2022.05);
(Continued)

(58) Field of Classification Search
CPC ............... H04L 65/1089; H04L 65/403; H04L 65/4069; H04L 65/4092; H04L 65/608;
(Continued)

(56) References Cited

U.S. PATENT DOCUMENTS 7,310,334 B1 * 12/2007 FitzGerald .............. H04L 65/65
370/352
8,713,193 B1 * 4/2014 Breau .................... H04L 65/613
725/89
(Continued)

FOREIGN PATENT DOCUMENTS

JP       2017-027247       2/2017
KR    10-2018-0049243      5/2018

OTHER PUBLICATIONS

"3rd Generation Partnership Project; Technical Specification Group Core Network and Terminals; Mission Critical Video (MCVideo) media plane control; Protocol specification (Release 15)", 3GPP TS 24.581, 3rd Generation Partnership Project (3GPP), Jun. 2018, pp. 118-122 (Year: 2018).*
(Continued)

*Primary Examiner* — Vivek Srivastava
*Assistant Examiner* — William C McBeth
(74) *Attorney, Agent, or Firm* — Nixon & Vanderhye, P.C.

(57) ABSTRACT

The present invention relates to a method for controlling the streaming of multimedia data in a network. The method comprising receiving, from a client device by a server, a request to control reception of at least one media stream from amongst a plurality of media streams as present in
(Continued)

multimedia-data undergoing streaming by the client device, analysing the contents of the request to identify at least one of: a reception control message; the at least one media selected; and a type of control to be performed with respect to the at least one media, and responding the client device based on said analysis of the request by suspending or resuming the streaming of the at least one media stream from amongst the plurality of media streams in the multimedia data.

12 Claims, 13 Drawing Sheets

(51) Int. Cl.
    *H04L 65/80* (2022.01)
    *H04L 65/61* (2022.01)
    *H04L 65/65* (2022.01)
    *H04L 65/613* (2022.01)

(52) U.S. Cl.
    CPC ........... *H04L 65/613* (2022.05); *H04L 65/65* (2022.05); *H04L 65/80* (2013.01)

(58) Field of Classification Search
    CPC ....... H04L 65/61; H04L 65/613; H04L 65/65; H04L 12/1813; H04L 12/1822; H04L 12/1827; H04L 65/1083; H04L 65/1086; H04L 65/1092; H04N 7/15; H04N 7/152; H04N 21/637; H04N 21/6377
    See application file for complete search history.

(56) References Cited

U.S. PATENT DOCUMENTS

| | | | | |
|---|---|---|---|---|
| 2004/0125757 A1* | 7/2004 | Mela | ...................... | H04L 65/613 370/261 |
| 2006/0090187 A1* | 4/2006 | Chae | ...................... | H04L 65/613 709/219 |
| 2006/0149811 A1* | 7/2006 | Bennett | ............... | H04L 65/1104 709/203 |
| 2007/0109978 A1* | 5/2007 | Miriyala | ............. | H04L 12/1813 370/260 |
| 2008/0267282 A1* | 10/2008 | Kalipatnapu | ....... | H04L 12/1822 348/E7.084 |
| 2008/0305820 A1* | 12/2008 | Sadiq | .................. | H04L 65/4061 455/518 |
| 2009/0037596 A1* | 2/2009 | Math | ..................... | H04L 65/613 709/231 |
| 2009/0204719 A1* | 8/2009 | Simongini | .......... | H04L 65/1089 709/231 |
| 2010/0019899 A1* | 1/2010 | Zhang | ................ | H04N 21/6371 340/540 |
| 2011/0307624 A1* | 12/2011 | Shatsky | .............. | H04L 65/4084 370/310 |
| 2012/0072499 A1* | 3/2012 | Cipolli | .................. | H04L 65/403 709/204 |
| 2013/0041954 A1* | 2/2013 | Kim | ..................... | H04L 65/1089 709/204 |
| 2013/0091526 A1* | 4/2013 | Iyer | ...................... | H04L 65/4015 725/62 |
| 2013/0159471 A1* | 6/2013 | Saada | ................. | H04L 65/4038 709/219 |
| 2013/0286879 A1* | 10/2013 | ElArabawy | ......... | H04L 65/1083 370/252 |
| 2013/0339451 A1 | 12/2013 | Nyberg et al. | | |
| 2014/0115650 A1* | 4/2014 | Zhang | ................... | H04L 65/613 725/116 |
| 2016/0088029 A1 | 3/2016 | Grondal et al. | | |
| 2017/0251029 A1 | 8/2017 | Atarius et al. | | |
| 2018/0091564 A1* | 3/2018 | Ivov | .................... | H04L 65/1089 |
| 2018/0183849 A1* | 6/2018 | Shin | ....................... | H04L 65/65 |
| 2018/0288827 A1 | 10/2018 | Pattan et al. | | |
| 2019/0334969 A1* | 10/2019 | Ge | ....................... | H04L 65/1089 |

OTHER PUBLICATIONS

Burman et al., "RTP Stream Pause and Resume", Internet Engineering Task Force RFC 7728, Feb. 2016 (Year: 2016).*
Schulzrinne et al., "Real Time Streaming Protocol (RTSP)", Network Working Group RFC 2326, Apr. 1998 (Year: 1998).*
Grozev, Boris, et al. "Last N: relevance-based selectivity for forwarding video in multimedia conferences." Proceedings of the 25th ACM Workshop on Network and Operating Systems Support for Digital Audio and Video. 2015. (Year: 2015).*
Extended Search Report dated Apr. 20, 2021 in counterpart European Patent Application No. 19858954.1.
International Search Report for PCT/KR2019/011817, dated Dec. 19, 2019, 3 pages.
Written Opinion of the ISA for PCT/KR2019/011817, dated Dec. 19, 2019, 6 pages.
"3rd Generation Partnership Project; Technical Specification Group Core Network and Terminals; Mission Critical Video (MCVideo) signalling control; Protocol specification (Release 15)" , 3GPP TS 24.281, V15, 1.0; Jun. 20, 2018, 436 pages.
3rd Generation Partnership Project; Technical Specification Group Services and System Aspects; Mission Critical Push To Talk (MCPTT); Stage 1 (Release 16); 3GPP TS 22.179 V16.5.0 (Mar. 2019), 88 pages.

* cited by examiner

[Fig. 1]
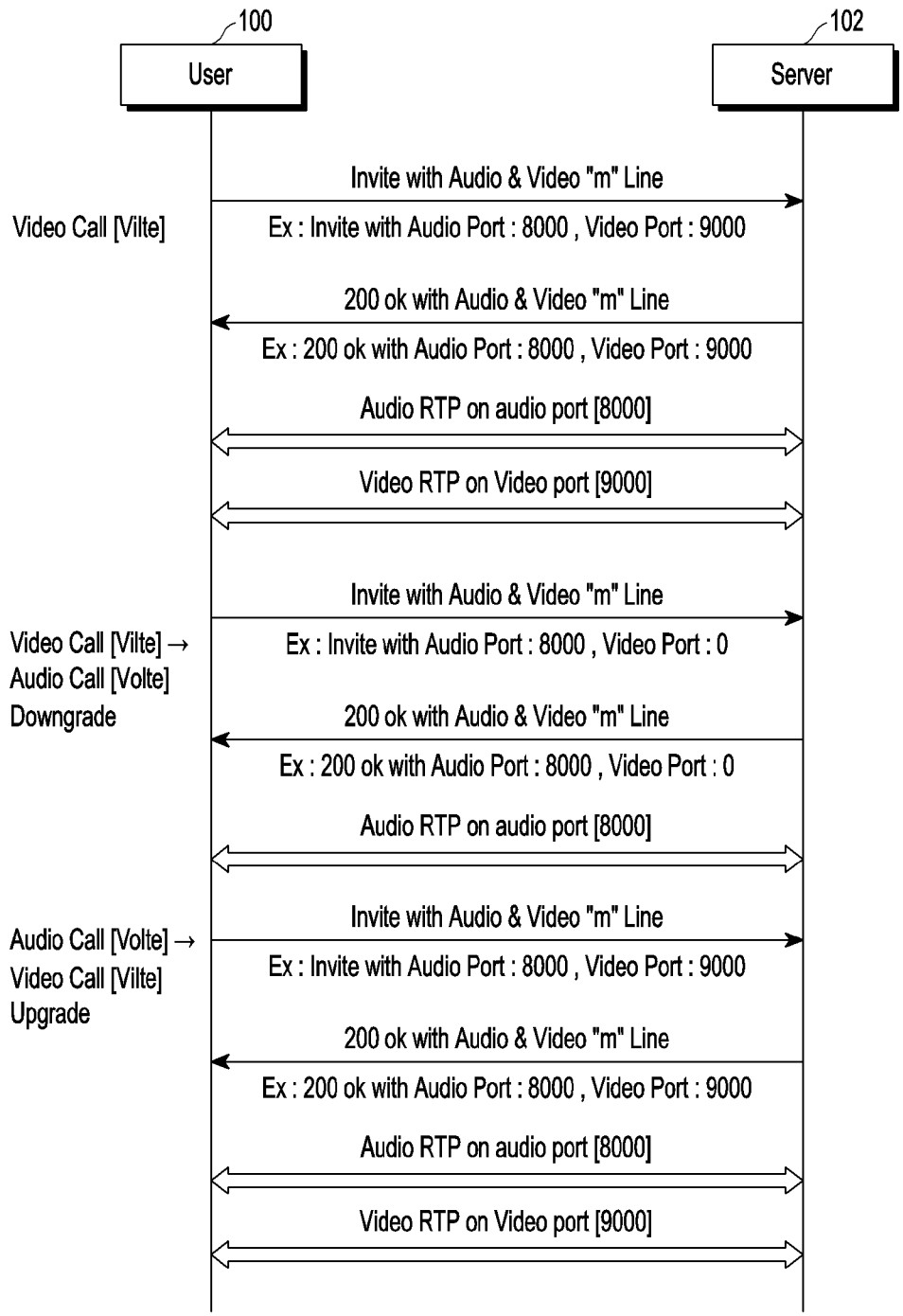

[Fig. 2]
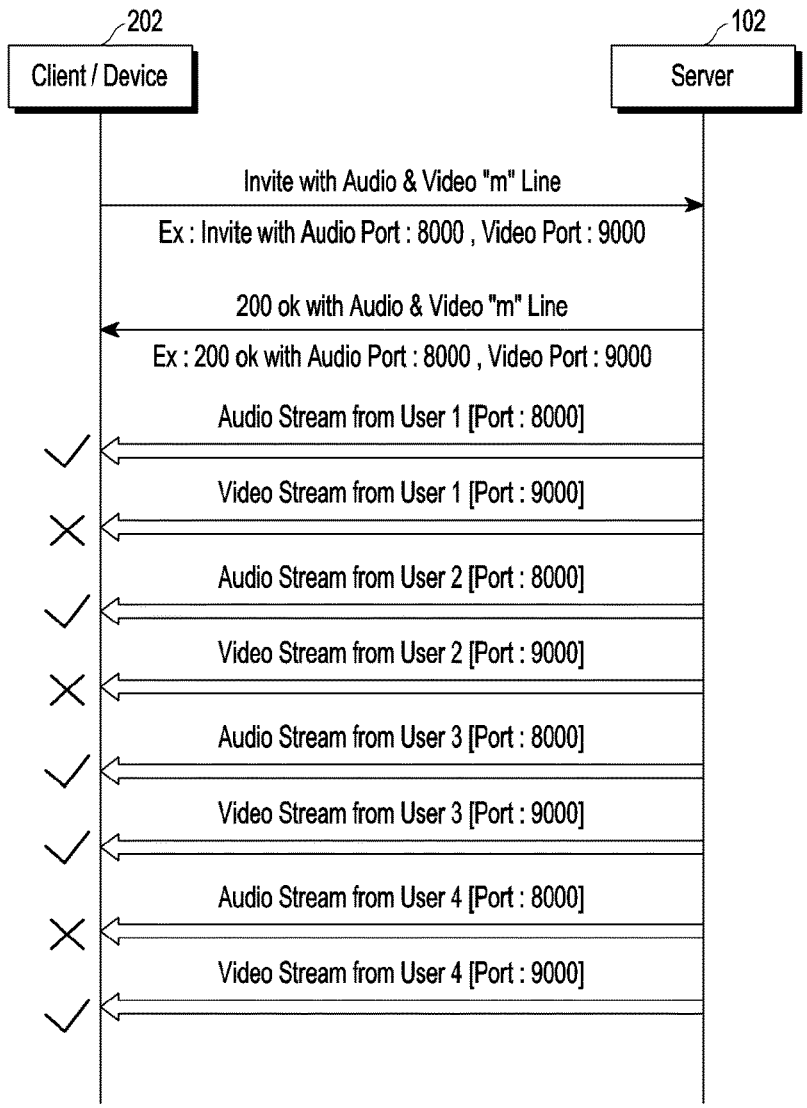
[Fig. 3]
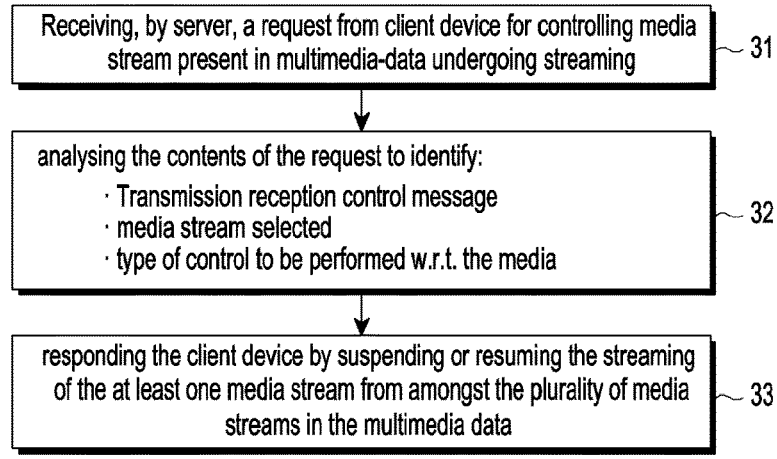

[Fig. 4]
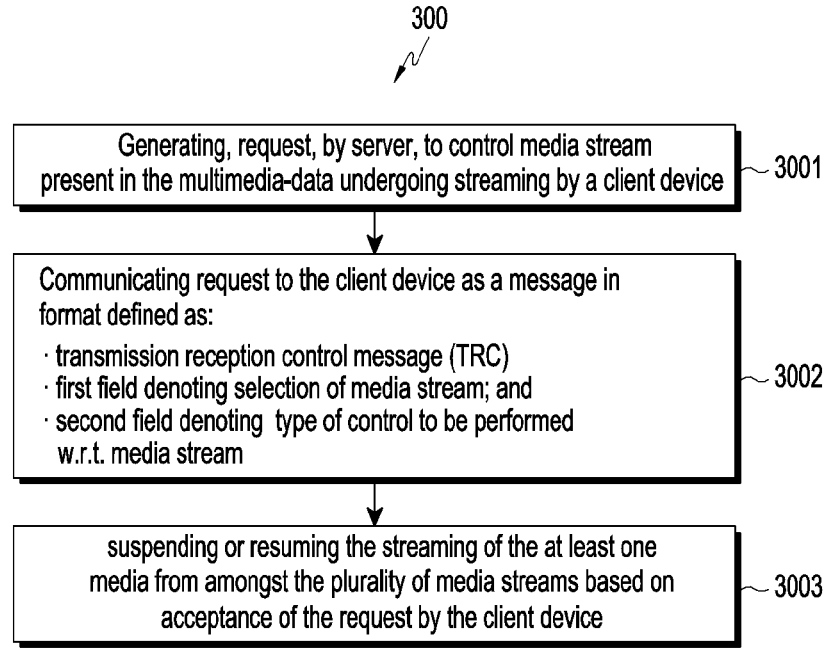
[Fig. 5]
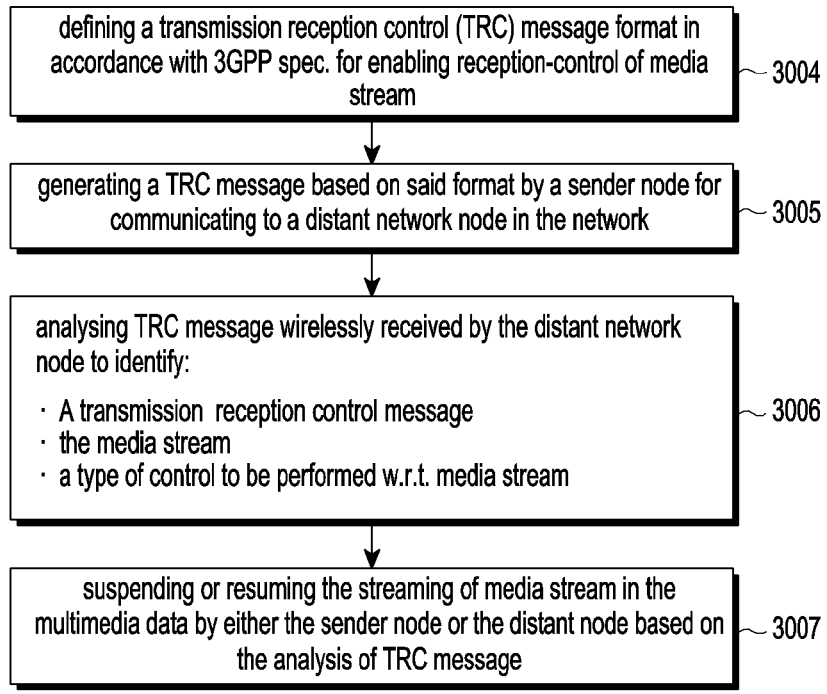

[Fig. 6]
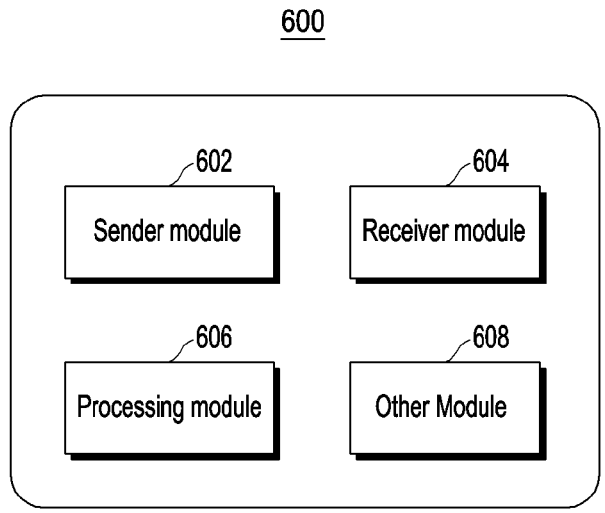
[Fig. 7]
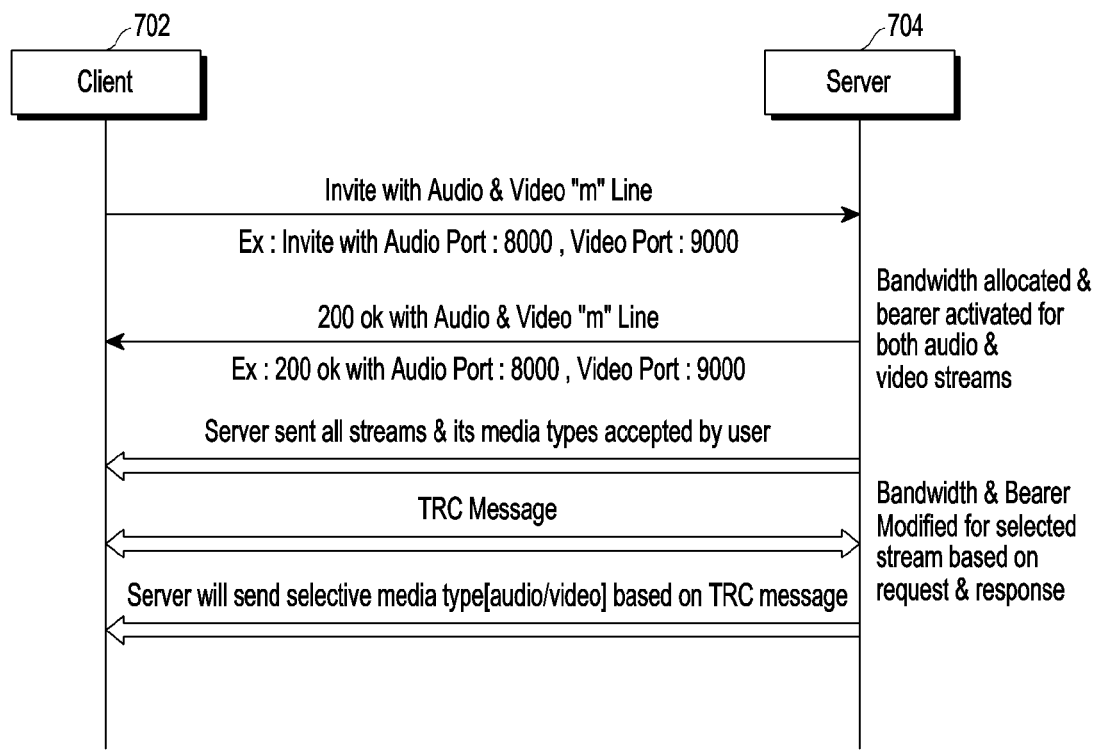

[Fig. 8]
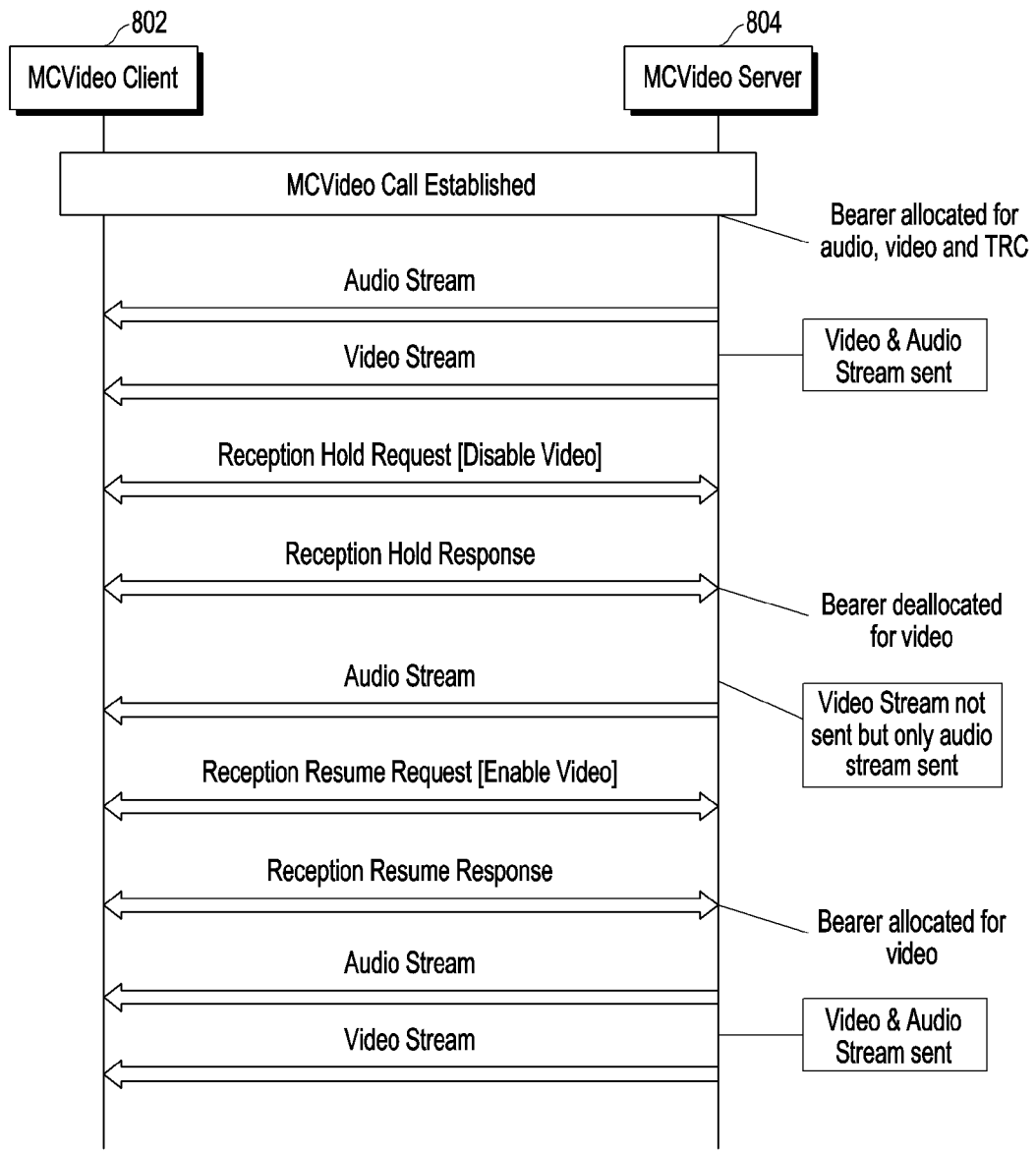

[Fig. 9a]
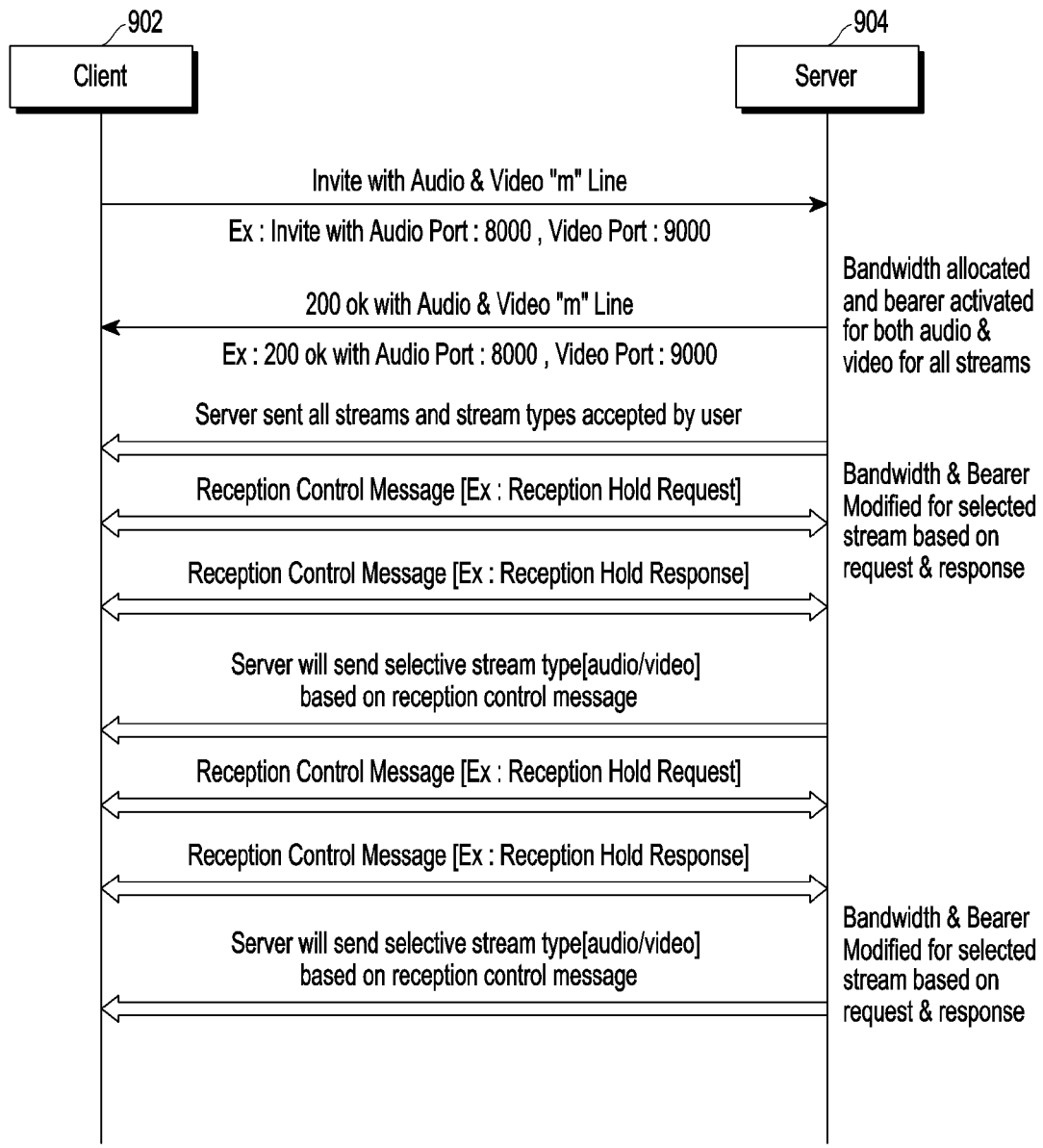

[Fig. 9b]
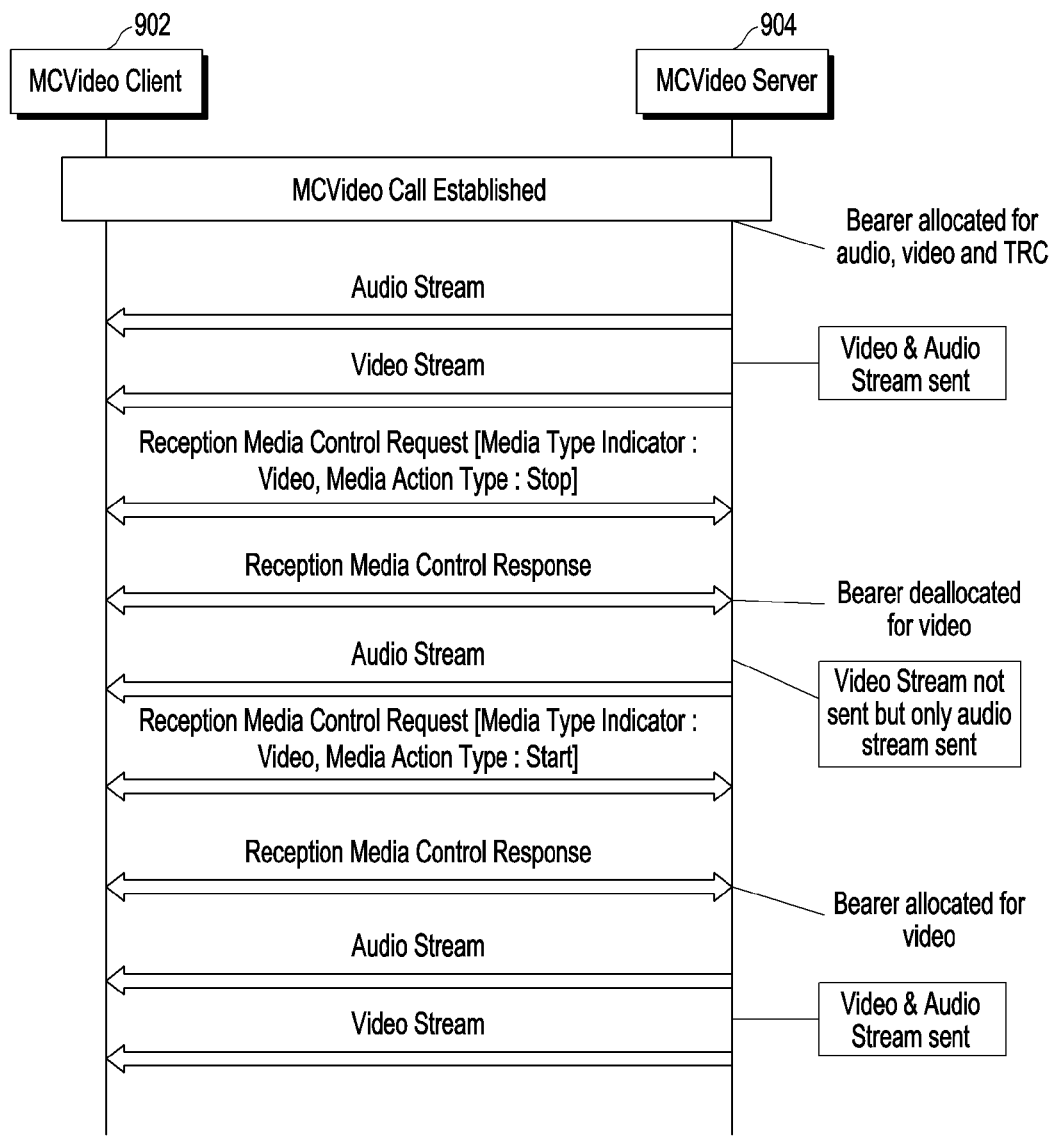

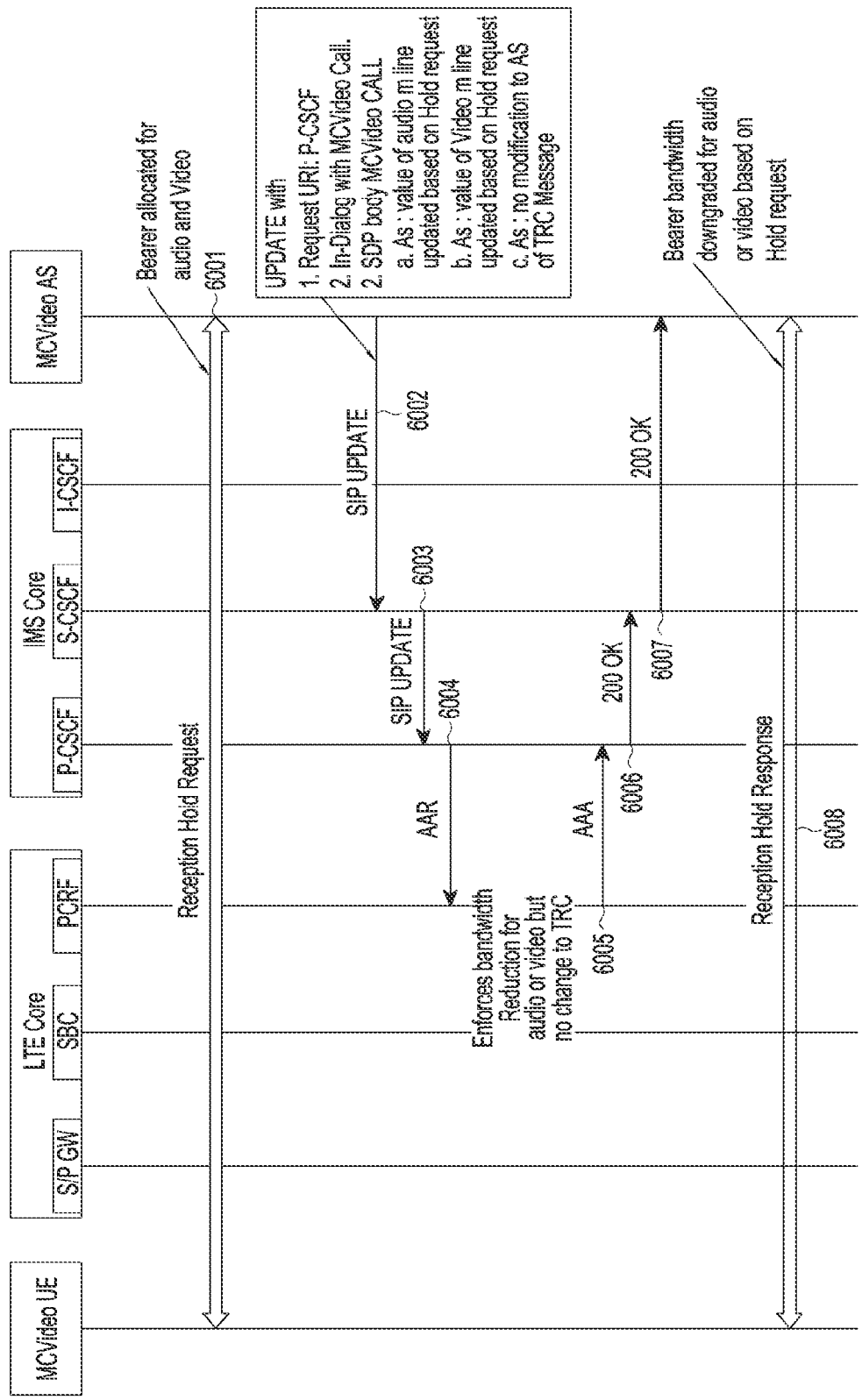
[Fig. 10]

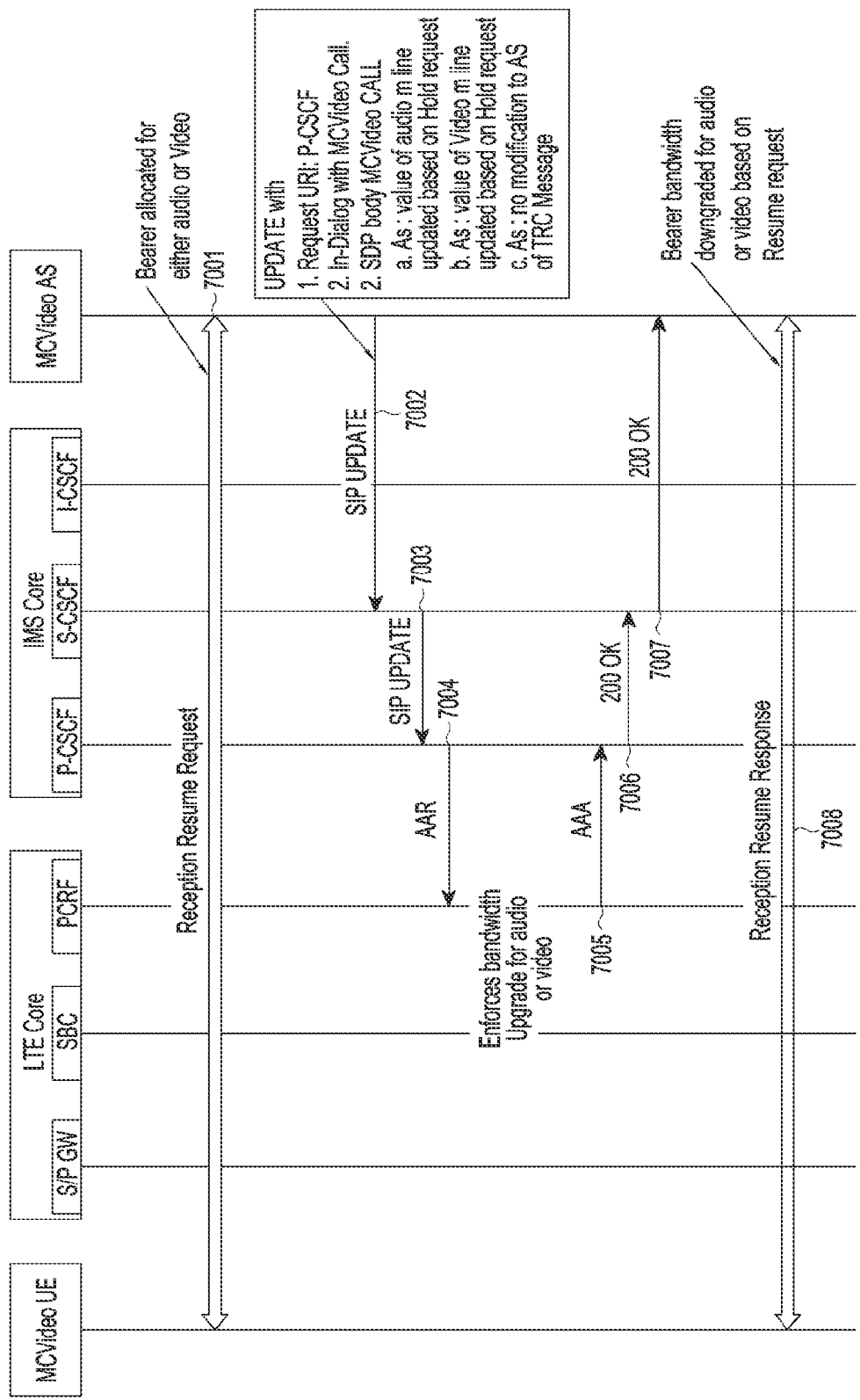
[Fig. 11]

[Fig. 12]
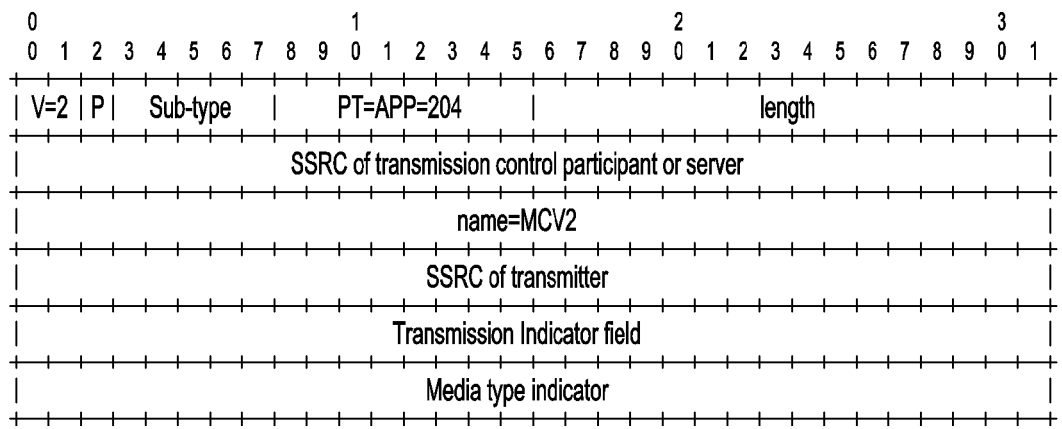
(a)
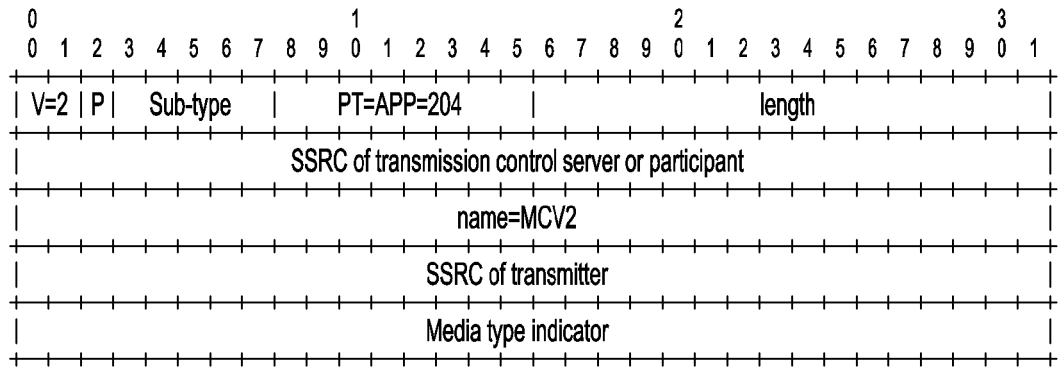
(b)

[Fig. 13]
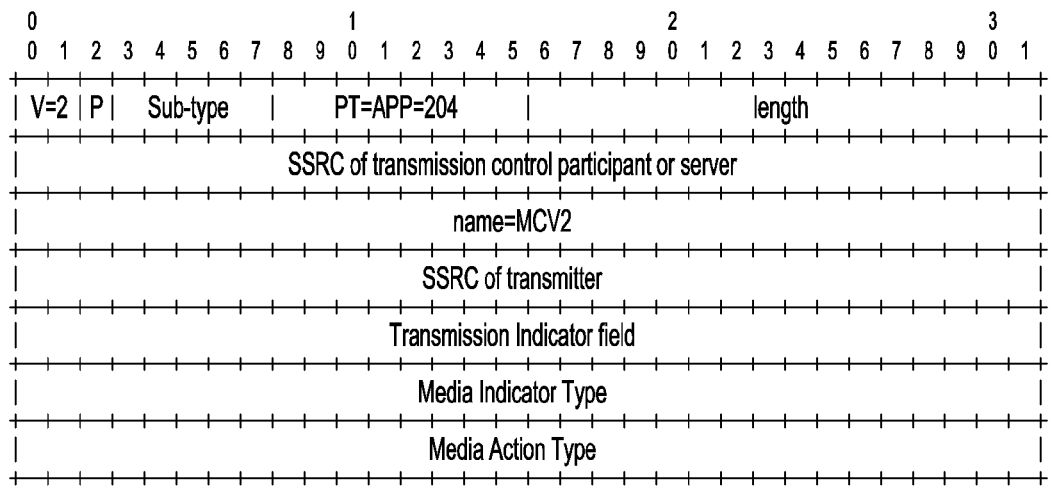
(a)
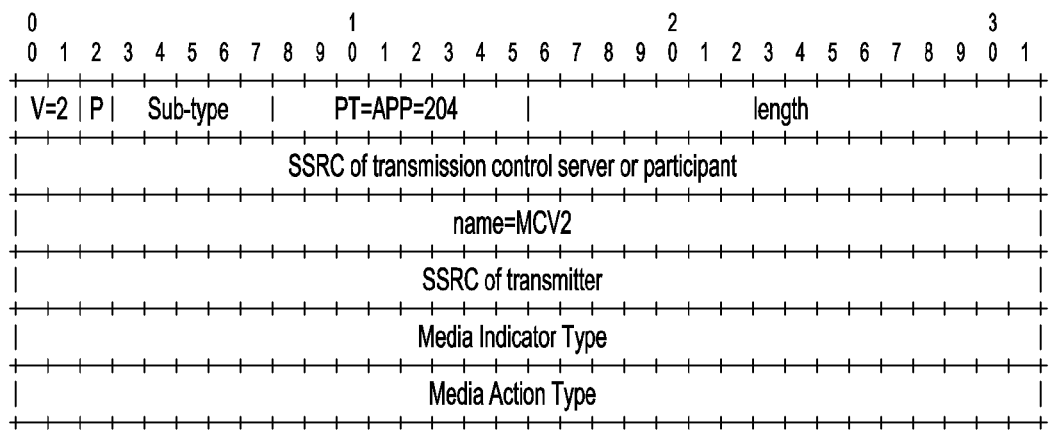
(b)

[Fig. 14]
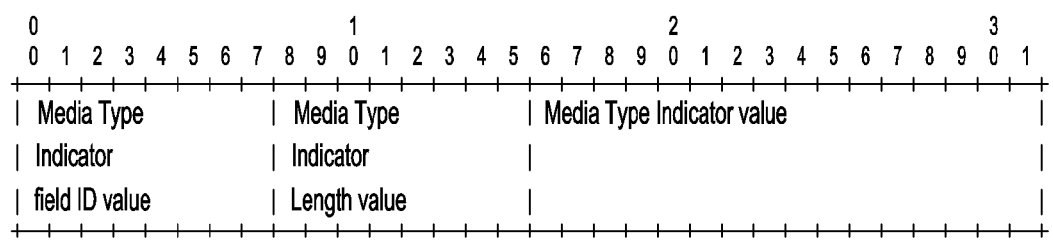
(a)
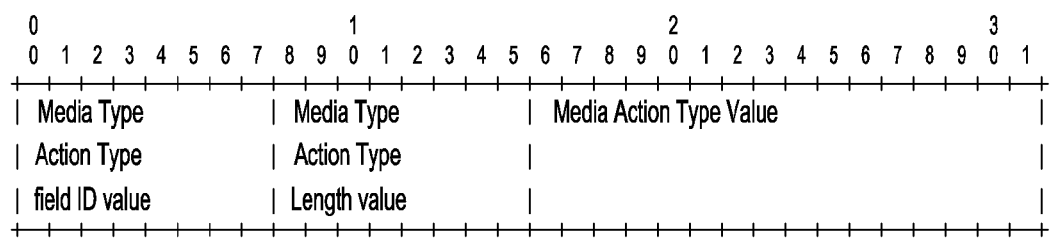
(b)

[Fig. 15]
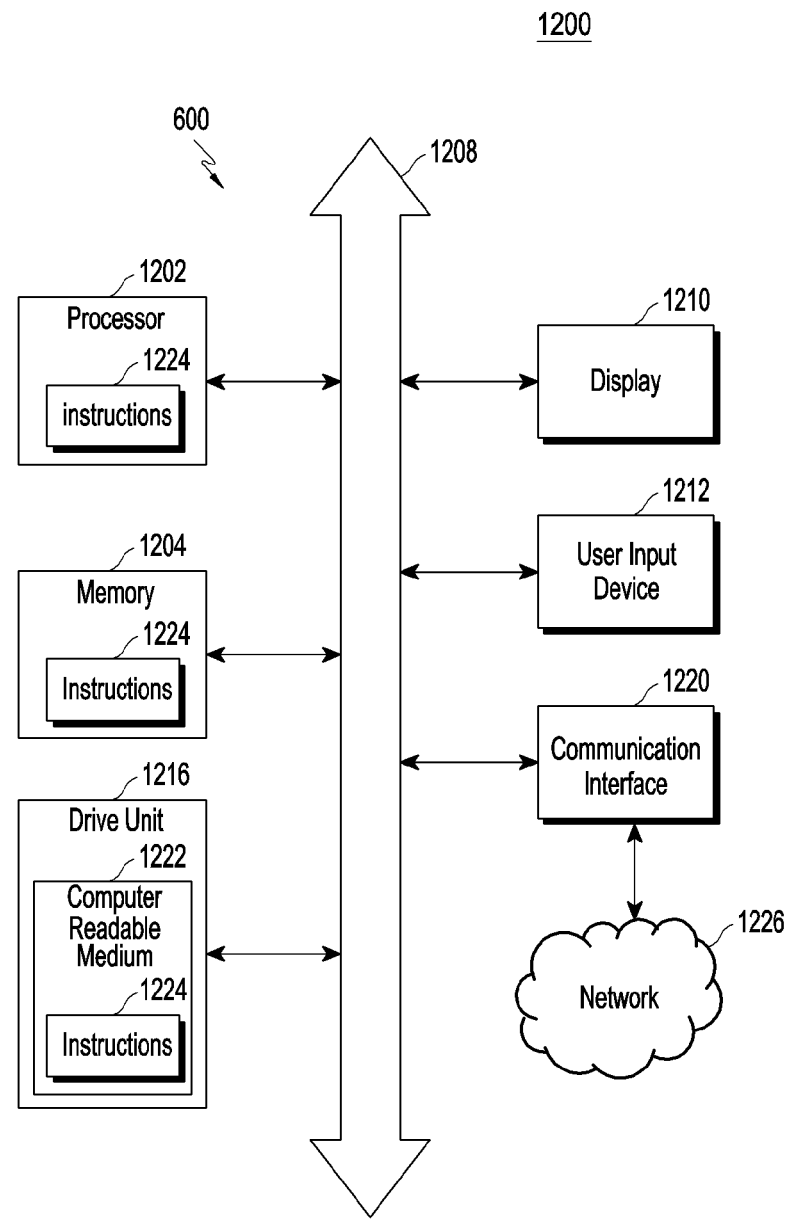

METHOD AND APPARATUS FOR CONTROLLING STREAMING OF MULTIMEDIA DATA IN A NETWORK

CROSS-REFERENCE TO RELATED APPLICATIONS

This application is a National Phase Entry of PCT International Application No. PCT/KR2019/011817, which was filed on Sep. 11, 2019, and claims priority to Indian Provisional Patent Application No. 201811034424, which was filed on Sep. 12, 2018, and Indian Complete Patent Application No. 201811034424, which was filed on Sep. 10, 2019, the contents of which are incorporated herein by reference.

FIELD

The present disclosure relates to data streaming systems and in particular, relates to multimedia data streaming applications.

DESCRIPTION OF RELATED ART

With the continuous growth and development in the telecommunication industry, mobile devices, and rampant usage of packet-data enabled services, multi-user conference calls, and communication systems have become quite popular nowadays. Such calls usually involve a plurality of participants communicating among them. However, the presence of multiple-participants in a single communication instance often leads to chaos and cacophony which in turn, often leads to miscommunication. Such issues are found more prominently in the case of applications, for example, as Mission-Critical Services.

The Mission critical services are regarded as critical to an operation, such that any disruption or failure with respect to reception of the data pertaining to such service may be catastrophic and probable to cause fatalities since mission-critical service is known to be connected with preventing loss of human life and property.

In an example, Mission Critical Video also referred to as MCVideo, is one of the services used for Mission Critical audio-video communication in multi-user environment or multiple location environment. Such services may be relevant, especially for agencies providing Public Safety services such as Police-services, Fire Services, and Ambulance services. Therefore, in order to cater to emergency-situations as generally experienced by the Public Safety services, the mission-critical services need to be rendered with high reachability, availability, reliability, low latency, real-time operating capabilities, interoperability with other services and systems, private and group communications, handling of emergencies and ability to provide prioritization, pre-emption, queuing, and Quality of Service.

In the video conference environment, each user receives multiple audio & video-streams simultaneously. Accordingly, in the case of transmission/reception from a plurality of sources, chaos is all but likely to be caused. Owing to the limitation of interpretation by a human-brain, it may be desired to switch off audio-streaming with respect to certain stream while allowing video-streaming with respect to other streams in case of multimedia data streaming.

Currently, there is no option available to selectively receive audio and video Accordingly, the fact remains users are forced to receive both audio and video streams from all users as a part of the reception, thereby maintaining the chaos and cacophony for the user. As a result, a lot of network bandwidth is wasted and power utilization of device increases, since client and server remain occupied with processing/sending media streams which may be of otherwise no use for a user.

Moreover, data-consumption, in order to accommodate such a virtual conference environment, is significantly high for each participant. Therefore, in case a participant doesn't have access to sufficient internet-connectivity, the participant may not be able to participate in the virtual-conference. In an example, conventional techniques that are available for controlling the MCVideos in view of low network connectivity amount to control all streams of audio & video media using signaling messages in MCVideo sessions, particularly, all streams of either audio or video media are completely stopped to reduce data consumption.

FIG. 1 illustrates a prior art arrangement with respect to an example of the Session Initiation Protocol (SIP)/Session Description Protocol (SDP) Negotiation to control Audio/Video streams. SDP along with SIP may describe multimedia sessions in a format understood by participants of a virtual conference. As shown, a user 100 requests a server 102 for establishing a connection between multiple users through an audio-video call, also referred to as a virtual conference call. Upon establishing the connection, the user 100 may receive audio streams and video streams through an audio port 8000 and a video port 9000, respectively. Each participant of the virtual conference call may have an exclusive corresponding audio stream and video stream relative to the other participants. For example, in a virtual conference call involving 4 users, each user may receive three video streams and three audio streams corresponding to 3 other users.

Now, in order to save bandwidth of the virtual conference, server 102 may stop transmitting the video streams through the video port 9000 to the user 100. Further, upon receiving a request to resume the video streams, the server 102 may resume the transmission of the video streams through the video port 9000. Therefore, since there is only one port used for all video streams, i.e., the video port 9000, for all the video streams, either all the video streams are transmitted/received or all the video streams are blocked. Similarly, owing to the all audio streams using only port, i.e., the audio port 8000, for all the audio streams, either all the audio streams are transmitted/received or all the audio streams are blocked.

Therefore, it is not possible to selectively receive one or more of the audio streams and the video streams of the same virtual conference session. For example, in a virtual conference call of a plurality of users (say 5), existing technology does not allow the user 100 to receive an audio stream of a second user, an audio stream of a third user, an audio-video stream of a fourth user, and a video stream of a fifth user.

FIG. 2 illustrates controlling Audio/Video streams in a virtual conference call without using server support, according to one or more existing techniques. These techniques involve receiving packets at a device 202 of the user 100. The packets corresponding to the audio streams and the video streams for all the other users who are participants in the virtual conference call. In the virtual conference call with a plurality of users (say 5) including the user 100 as the participant, the user 100 may receive the packets pertaining to the audio streams and the video streams of the other four participating users.

Accordingly, the user 100 may wish to receive the audio stream of the second user and the third user, the audio stream and the video stream of the fourth user, and the video stream of the 5th user. In such a case, after receiving the packets from the server, the device 202 of the user 100 may discard the packets corresponding to unwanted streams of the other users. In the above-mentioned method, the server support is not required to control Audio/Video streams during the session. Therefore, in this technique, the device 202 of the user 100 receives all the packets and only thereafter discards the unwanted packets, based on user preference.

However, the present techniques involve wastage of network bandwidth, high rate of power consumption of the user device 202, and delay in the processing of valid packets. The delay in the processing of the valid packets is at-least due to the time taken in the identification and discarding of the invalid packets.

Overall, the existing techniques of controlling audio-video stream are ineffective, bandwidth wasting, power-consuming, and time-intensive.

Accordingly, there lies an imminent need for controlling different streams in multimedia data.

There lies an imminent need for accessing multimedia data without being constrained by the limits posed by network connectivity.

SUMMARY

This summary is provided to introduce a selection of concepts in a simplified format that are further described in the detailed description of the invention. This summary is not intended to identify key or essential inventive concepts of the claimed subject matter, nor is it intended for determining the scope of the claimed subject matter.

In an aspect of the present disclosure, there is provided a method for controlling streaming of multimedia data in a network, the method comprising: receiving, from a client device by a server, a request to control at least one media stream from amongst a plurality of media stream as present in multimedia-data undergoing streaming by the client device. The client device in turn receives at least one multimedia-data comprising a plurality of media streams from at least one content provider. The method further comprises analysing the contents of the request to identify at least one of (a) a Transmission Reception Control message; (b) the at least one media selected; and (c) a type of control to be performed with respect to the at least one media. The method further comprises responding to the client device based on the analysis of the request by suspending or resuming the streaming of at least one media stream from amongst the plurality of media streams in the multimedia data.

In another aspect of the present disclosure, there is provided a method for controlling streaming of multimedia data in a network, the method comprising generating, by a server, a request to control at least one media stream from amongst a plurality of media stream as present in the multimedia-data undergoing streaming by a client device. The method further comprises communicating the request to the client device as a message in the format defined as at least one of: a) a Transmission Reception Control message; b) a first field denoting a selection of the at least one media stream; and c) a second field denoting the type of control to be performed with respect to the at least one media stream. The method further comprises suspending or resuming the streaming of at least one media stream from amongst the plurality of media streams based on acceptance of the request by the client device.

In another aspect of the present disclosure, there is provided a method for controlling streaming of multimedia data in a network, the method comprising: defining a Transmission Reception Control (TRC) message format in accordance with 3GPP specification for enabling control of at least one media stream out of a plurality of media stream in a multimedia data. The method further comprises generating a TRC message based on the format by a sender node for communicating to a distant network node in the network, followed by analyzing the TRC message wirelessly received by the distant network node to identify at least one of: a) a reception control message; b) the at least one media stream; and c) a type of control to be performed with respect to at least one media.

The method further comprises suspending or resuming the streaming of the at least one media stream from amongst the plurality of media stream in the multimedia data by either the sender node or the distant node based on said analysis of the TRC message.

To further clarify the advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 illustrates a prior art mechanism illustrating Session Initiation Protocol (SIP)/Session Description Protocol (SDP) Negotiation to control Audio/Video streams;

FIG. 2 illustrates a prior art mechanism illustrating controlling of Audio/Video streams in a virtual conference call without using server support;

FIG. 3 illustrates method steps, in accordance with the embodiment of the invention;

FIG. 4 illustrates method steps, in accordance with another embodiment of the invention;

FIG. 5 illustrates method steps, in accordance with another embodiment of the invention;

FIG. 6 illustrates a system, in accordance with another embodiment of the invention;

FIG. 7 illustrates the use of TRC message(s) flow between server and client for controlling audio/video streams by selectively stopping/starting the specific media type, according to an embodiment of the present disclosure;

FIG. 8 illustrates a method for controlling a single audio-video stream in Mission Critical Video (MCVideo), according to an embodiment of the present disclosure;

FIG. 9*a* illustrates a method for controlling multiple audio-video streams in Mission Critical Video (MCVideo), according to an embodiment of the present disclosure;

FIG. 9*b* illustrates a method for controlling single audio-video streams in Mission Critical Video (MCVideo), according to another embodiment of the present disclosure FIG. 10 illustrates a call-flow representing MCVideo UE/Server initiated Reception Hold request, according to an embodiment of the present disclosure;

FIG. 11 illustrates a call-flow representing MCVideo UE/Server initiated Reception Resume Request, according to an embodiment of the present disclosure;

FIG. 12 illustrates an example TRC message(s) exchanged between server and client, according to an embodiment of the present disclosure;

FIG. 13 illustrates another example TRC message(s) exchanged between server and client, according to another embodiment of the present disclosure;

FIG. 14 illustrates example specific fields in example TRC message(s) of FIG. 12 and FIG. 13, respectively, according to another embodiment of the present disclosure;

FIG. 15 shows an example of a computing-device based implementation of the system as depicted in FIG. 6, in accordance with the embodiment of the present subject matter.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF EXAMPLE EMBODIMENTS

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

Aspects of the present subject matter relate to systems and methods to control audio-video stream in mission control videos. Embodiments of the present invention are described below in detail with reference to the accompanying drawings.

The present disclosure provides a system and a method of selectively controlling audio & video streams in a multi-user call. A multi-user call includes a plurality of participants connected to each other through audio and video communication. In an embodiment, the present invention discloses a new message format to control the audio & video streams for selective transmission or receipt of the audio & video streams in a live session or a group call. In another embodiment, the present disclosure also provides a new control-specific field, for example, "Media Type", field which will be used to select media type (audio or video) which need to be controlled.

In another implementation, the plurality of media within the multimedia data comprises one or more of an audio stream, a video stream, a text communication and a flashwork. Further, the request to control the reception of one or more media is a message formatted in accordance with Transmission Reception Control (TRC) message of 3GPP specification and is categorized as either reception-hold, reception-resume, a single reception control command for facilitating both reception-hold and reception resume operation. The message is further associated with Transmission Reception Control (TRC) specific field of 3GPP specification and defined either by a media type defined by at least one of audio, video, and text or action defined by at least one of start and stop operation in respect of the at least one media. The analysis of the contents of the request comprises analyzing the transmission-reception control messages at a user-network interface (UNI) defining the interface between the client device and a bearer-network.

In an embodiment, a new Transmission or Reception Control (TRC) message is designed to control the audio streams and the video streams. One message is adapted for stopping specific media type (audio/video) while the other message is meant for starting the specific media type. In another embodiment, a single Transmission or Reception Control message is proposed with new control-specific field added to the this message for identifying the audio and video streams and further identifying the action (hold or resume) to be undertaken for the identified stream.

FIG. 3 depicts a method for controlling the streaming of multimedia data in a network. The method comprising the following steps:

Step 31 comprises receiving a request, from a client device by a server, to control at least one media stream from amongst a plurality of media streams as present in multimedia-data undergoing streaming by the client device. The client device in turn receives at least one multimedia data comprising a plurality of media streams from at least one content provider or a host server.

Step 32 comprises an analysis of the contents of the request to identify at least one of a) a transmission-reception control message, b) the at least one media streams selected and c) a type of control to be performed with respect to the at least one media stream.

Step 33 comprises responding to the client device based on said analysis of the request by suspending or resuming the streaming of at-least one media stream from amongst the plurality of media stream in the multimedia data. The responding comprises de-allocating a bearer-service with respect to the at least one media stream and/or downgrading a bearer-bandwidth associated with at least one media stream. The responding also comprises re-allocating a bearer-service with respect to the at least one media stream and/or upgrading a bearer-bandwidth associated with at least one media stream.

In an example implementation, when the client doesn't intend to receive any particular media type, i.e., either audio or video, from the server, the MCVideo User Equipment sends the Reception Hold Request to MCVideo server. In response to sending the Reception Hold Response, the MCVideo Server is adapted to primarily stop sending the media packets of specific media types, i.e., audio or video, followed by communicating with the Core Network to reduce the bandwidth of stopped media type.

Similarly, when the client intends to receive a particular media type, i.e., audio or video, from server, the MCVideo User Equipment sends Reception Resume Request to MCVideo server. In response to sending Reception Resume Response, MCVideo Server is adapted to communicate with Core Network to increase bandwidth to support resumed media type and start sending the media packets of specific media type, i.e., Audio or Video, to the client.

FIG. 4 depicts another method for controlling streaming of multimedia data in a network, and comprises the following steps:

Step 3001 comprises the generation of a request, by the server, to control at least one media stream from amongst the plurality of media streams as present in the multimedia-data undergoing streaming by the client device.

Step 3002 comprises communicating the request to the client device as a message in format defined as at least one of a) a transmission-reception control message, b) a first field denoting selection of the at least one media stream, and c) a second field denoting type of control to be performed with respect to the at least one media stream.

Step 3003 comprises suspending or resuming of the streaming of at least one media stream from amongst the plurality of media streams. The server is adapted to generate the request based on network congestion for preventing the streaming of one or more media streams in the multimedia data and/or an urgency associated with communication of a particular one or more media streams within the multimedia data.

In one implementation, if the server discovers that any of the streams is extremely significant, as for example Emergency situation, and needs to be addressed by all the users, then the server is adapted to force users to receive a Held stream by sending "Reception Resume" message. In another implementation, if the server discovers network congestion and there prevails the feasibility of transmitting audio stream only, then to disable the video content, the server sends the "Reception Hold" message. Accordingly, depending upon the network-conditions and associated local policy, the server is adapted to send Reception Hold and Resume Request.

FIG. 5 illustrates a method for controlling the streaming of multimedia data in a network and comprising the following steps:

Step 3004 comprises defining a Transmission Reception Control (TRC) message format in accordance with 3GPP specification for enabling control of at least one media stream out of a plurality of media streams in a multimedia data.

Step 3005 comprises generation of TRC message based on the format by a sender node (server or client) for communicating to a distant network node (server or client) in the network.

Step 3006 comprises analysis of the TRC message wirelessly received by the distant network node to identify at least one of:
(a) Transmission Reception Control message;
(b) the at least one media stream; and
(c) type of control to be performed with respect to at least one media stream.

Step 3007 comprises suspending or resuming the streaming of the at least one media stream from amongst the plurality of media streams in the multimedia data by either the sender node or the distant node based on said analysis of the TRC message.

In an implementation depicting the formation TRC message format, there is provided a format of the new transmission or reception control message to control the audio streams and the video streams in the MCVideo. In the present embodiment, for stopping and resuming/starting at least one of the audio streams or the video streams, a corresponding control message is generated. In an embodiment, a single control message is generated for stopping as well as for resuming/starting the stream. The format of the control message is used for controlling one or more streams, which are part of the same session/group.

The below example Table 1 illustrates four new TRC messages (as indicated by * in the last few rows) proposed in 3GPP spec 24.581, all the messages are bi-directional, i.e., client and server can send and receive from each other.

TABLE 1

Transmission control specific messages sent by both the transmission control server and transmission control participant.

| Message Name | Subtype | Reference | Direction |
| --- | --- | --- | --- |
| Transmission end request | X0000 | Subclause 9.2.20 | Client→server and Server→client |
| Transmission end response | X0001 | Subclause 9.2.21 | Client→server and Server→client |
| Media reception end request | X0010 | Subclause 9.2.26 | Client→server and Server→client |
| Media reception end response | X0011 | Subclause 9.2.27 | Client→server and Server→client |
| Transmission control ack | X0100 | Subclause 9.2.31 | Client→server and Server→client |
| *Reception hold request | X0101 | Subclause 9.2.32 | Client→server and Server→client |
| *Reception hold response | X0110 | Subclause 9.2.33 | Client→server and Server→client |
| *Reception resume request | X0111 | Subclause 9.2.34 | Client→server and Server→client |
| *Reception resume response | X1000 | Subclause 9.2.35 | Client→server and Server→client |

NOTE:
The transmission control server is the server and the transmission participant is the client In an embodiment, if two new control messages are defined, i.e., a first message for stopping a media stream and a second message for resuming/starting a media stream, then two new "Subtype" field value is defined. Further, if the single control message is defined for stopping as well as for resuming/starting media streams, then a single new "Subtype" field value should be defined. A "length" field of the control message in a Real-time Transport Protocol (RTP) Control Protocol (RTCP) header is indicative of the length of a packet in 32-bit words, without counting the first 32-bit word in which the "length field" is resided. Further, a "name" of the control message is one of MCV0, MCV1, MCV2, and MCV3 as per American Standard Code for Information Interchange (ASCII), based on usage or message direction. Further, an "SSRC of the transmitter" field in the control message is indicative of the SSRC of the user or participant of the MCVideo whose media to be controlled. The content of the SSRC field is coded as specified in IETF RFC 3550.

In an implementation of the present disclosure, there is provided a first format of Reception Hold Response & Reception Resume Response for controlling the Audio & video streams, according to an embodiment of the present disclosure. The Reception Hold Response & Reception Resume Response is sent in response Reception Hold Request and Reception Resume Request respectively. Reception Hold Response & Reception Resume Response are bi-directional messages i.e. sent from control participant to the transmission control server and vice versa. The Media Type Indicator is an optional field in the response message. The Subtypes used for the process are as follows:

Reception Hold Request: Subtype value "x0101"

Reception Hold Response: Subtype value "x0110"

Reception Resume Request: Subtype value "x0111"

Reception Resume Response: Subtype value "x1000"

For some messages, the first bit (marked as "x" in the subtype) can be used to indicate if the sender intends to have an acknowledgment. The x is coded as follows:

"0" Acknowledgment is not required

"1" Acknowledgment is required

In an embodiment, values of the Subtype field for proposed TRC message can be based on requirements In an implementation connected with the aforesaid format of TRC message, there is provided specific fields "media type indicator" for defining the audio streams and the video streams to be controller in MCVideo, according to an embodiment of the present disclosure. The field "Media Type Indicator" is indicative of a type of media, i.e., either the audio stream or the video stream, which the user wants to control. In an embodiment, the Media Type Indicator" field is processed as below:

<Media Type Indicator Field Id>: New Binary value should be defined

The <Media Type Indicator Length> value is a binary value and has the value '2' indicating the total length in octets of the <Media Type Indicator Filed Id> value item.

The <Media Type Indicator Value> value is binary and can be coded as follows:

01 User/Server Want to Control Audio.

10 User/Server Want to Control Video.

11 User/Server Want to Control both Audio, Video.

In an embodiment, values of the "Media Type Indicator Value" are meant to vary based on requirements. Further, the value of spare bits is set to zero. In an embodiment when the MCVideo requirement is to control only one type of the stream, i.e., either the audio stream or the video stream, the "Media Type Indicator field" is not mandatory in the new message.

The following example Table 2 illustrates transmission control specific data fields (* indicated in last row), in which a new control specific field is projected in 3GPP spec 24.581.

TABLE 2

| Field Name | Field | | |
|---|---|---|---|
| | Decimal | Binary | Reference |
| Transmission Priority | 000 | 00000000 | Subclause 9.2.3.2 |
| Duration | 001 | 00000001 | Subclause 9.2.3.3 |
| Reject Cause | 002 | 00000010 | Subclause 9.2.3.4 |
| Queue Info | 003 | 00000011 | Subclause 9.2.3.5 |
| Granted Party's Identity | 004 | 00000100 | Subclause 9.2.3.6 |
| Permission to Request the Transmission | 005 | 00000101 | Subclause 9.2.3.7 |
| User ID | 006 | 00000110 | Subclause 9.2.3.8 |
| Queue Size | 007 | 00000111 | Subclause 9.2.3.15 |
| Message Sequence Number | 008 | 00001000 | Subclause 9.2.3.9 |
| Queued User ID | 009 | 00001001 | Subclause 9.2.3.14 |
| Source | 010 | 00001010 | Subclause 9.2.3.12 |
| Track Info | 011 | 00001011 | Subclause 8.2.3.13 |
| Message Type | 012 | 00001100 | Subclause 9.2.3.10 |
| Transmission Indicator | 013 | 00001101 | Subclause 9.2.3.11 |
| SSRC | 014 | 00001110 | Subclause 9.2.3.16 |
| Result | 015 | 00001111 | Subclause 9.2.3.17 |
| Message Name | 016 | 00010000 | Subclause 9.2.3.18 |
| Overriding ID | 017 | 00010001 | Subclause 9.2.3.8 |
| Overridden ID | 018 | 00010010 | Subclause 9.2.3.8 |
| Reception Priority | 019 | 00010011 | Subclause 9.2.3.19 |
| MCVideo Group Identity | 020 | 00010100 | Subclause 9.2.3.20 |
| *Media Type indicator | 021 | 00010101 | Subclause 9.2.3.21 |

In an implementation of the present disclosure, there is provided a second field in addition to the "media type" for controlling the audio streams and the video streams in MCVideo, according to an embodiment of the present disclosure. The second field "media action type" ensures stopping and resuming/starting of a specific media type using the single control message. "Media Action" is indicative of stopping or resuming/starting of the audio streams and the video streams. In an embodiment when the "Media Action Type field" is present, the request operates as follows:

<Media Action Type Field Id>: New Binary value should be defined

The <Media Action Type Length> value is a binary value and has the value '2' indicating the total length in octets of the <Media Action Type Filed Id> value item.

<Media Action Type Value> value is binary and coded as follows:

00 Stop/Suspend Media—Type of which defined in Media Type Value

01 Start/Resume Media—Type of which defined in Media Type Value

In addition, values of the "Media Type Indicator Value", the "Media Action Type" are selected based on requirements and varied accordingly. Further, in an embodiment, the MCVideo requirement is to control only one type of streams, i.e., either the audio streams or the video streams. In such an embodiment, the "Media Type Indicator value may not be sent.

In another implementation, there is provided a request to receive a specific media type, according to an embodiment of the present matter. In this example, the new "Media Type Indicator" field is used in the "Reception Resume Request" message. In MCVideo context, the message is used to request the Audio/Video stream from the server, i.e., start receiving audio/video stream. In an embodiment when the "Media Type Indicator" field is not present, it is assumed that the user is interested in both the audio streams and the video streams, i.e., the user wants to receive the audio streams and the video streams. In another embodiment, when the "Media Type" field is present, the request is processed as follows:

01 User wants to receive only audio
10 User wants to receive only video
11 User wants to receive both audio & video In addition, values of the "Media Type Value" is selected, based on requirements, and is varied accordingly.

In another implementation, there is provided a request for stop receiving the specific media type, according to an embodiment of the present matter. In this example, the new "Media Type Indicator" field is used in the "Reception hold Request" message.

In the MCVideo context, the message is used to stop receiving the audio stream or the video stream from the server. In an embodiment when the "Media Type" field is not present, it is assumed that user is not interested in both the audio streams and the video streams, i.e., the user doesn't want to receive the audio streams as well as the video streams. In another embodiment when the "Media Type" field is present, the request is processed as follows:

01 User wants to stop only audio
10 User wants to stop only video
11 User wants to stop both audio & video Moreover, values of the "Media Type Indicator Value" is selected based on requirements and is varied accordingly. The "Media Type Indicator" field is added in any of the transmission-reception Control messages to control the audio streams and the video streams. In an embodiment when the server wants to stop/start the transmission/reception of any media type, for example, due to an internal error or to save bandwidth, then the server can also use any existing/new message and add "Media Type Indicator" field to convey information to the participants.

Further, in an embodiment when the user or the server control multiple streams which are part of the same group/session, by using a single message, then the "Media Type Indicator" format is modified accordingly. Similarly, multiple SSRC of various streams may also be transmitted. In such a case, the "Media Type Length value" may depend on a number of streams being controlled by the user or the server. In an embodiment, an order of the "Media Type Value Indicator" should match with an order of a SSRC list so that the server or the user may match streams and perform the corresponding action.

In another implementation, there is provided a message format where the "Media Type Indicator" and "Media Action Type" for multiple streams are transmitted in the single message, according to an embodiment of the present disclosure. Similarly, multiple SSRC of various streams are also transmitted. In such a case, the "Media Type Length value" and "Media Action Type Length" depends on the number of streams being controlled by the user or the server.

In an embodiment, an order of the "Media Type Indicator Value" and the "Media Action Type" should match with an order of the the SSRC list so that the server or the user may match the streams and perform the corresponding action.

In an embodiment, when the length of the <Media Type Indicator> value is not (2+ multiple of 4) bytes, then the "Media Type field value is padded. The value of the padding bytes is set to zero. In an embodiment, the padding bytes are ignored by the receiver.

In an embodiment, when the length of the <Media Action Type> value is not (2+ multiple of 4) bytes, then the "Media Action Type" value is padded. The value of the padding bytes is set to zero. In an embodiment, the padding bytes are ignored by the receiver.

Further, based on the media type, action type or on the new message, the server/network allocates or de-allocates bandwidth/bearer for the requested stream/session/media type. If none of the participants are receiving one particular media stream type, then the server sends "Release/End notification" to that particular granted participant using existing message and Media Type field or use newly proposed message format so that the granted participant may transmit only the requested streams.

FIG. 6 illustrates a detailed internal-construction of a system 600 in accordance with the embodiment of the present invention. The system 600 includes a sending module 602 that performs the step 33, 3001, 3002, 3005, a receiving module 604 that performs that step 31, and a processing module 606 that performs the step 32, 3003, 3006 and 3007. Likewise, there may be a miscellaneous module 608 within the system 600 that facilitates operational-interconnection among modules 602 till 606 and perform other ancillary-functions.

FIG. 7 illustrates the use of TRC message(s) flow between server and client for controlling audio/video streams by selectively stopping/starting the specific media type, according to an embodiment of the present disclosure.

In an embodiment, a user uses the client device 702 to interact with server 704 for establishing the connections between users. Upon establishing the connection, the user is eligible to receive multiple audio streams and multiple video streams from other sources or users. Further, the user can transmit a control message to the server 704. The control message may be indicative of at least one audio stream or video stream that the user may or may not want to receive from among all the audio streams and the video streams. Based on the control message, the server 704 forwards at least one audio stream or the video stream to the user and halt reception of the unwanted streams.

In an embodiment corresponding to FIG. 3, during the operation, the user communicates through a message based on transmission or reception control (TRC) format to control the audio streams and the video streams. One type of such TRC message is adapted for stopping specific media type (audio/video). Thereafter, the user may communicate another such TRC based message for resuming the specific media type.

In an implementation, the aforesaid TRC message as used for user-communication is based on a newly defined 'sub-type' as a part of the TRC message. 'Sub-types' define "hold" and "resume" command or simply a control message. Such reception "Hold" and "Resume" based TRC formatted messages are adapted for conserving the network bandwidth otherwise expended by undesirable streaming with respect to the user.

In addition, a newly defined control specific field referred to as 'media-type' is provided for defining either the audio or video streams to be controlled. In addition, another newly defined control specific field referred as 'action-type' may be provided for defining either the pause or resume action.

In an example operation, when the client doesn't intend to receive any particular media type, i.e., either audio or video, from server 704, the MCVideo User Equipment sends the Reception Hold Request to MCVideo server. As a part of sending the Reception Hold Response, the MCVideo Server is adapted to primarily halt sending of the media-packets of specific media types, i.e., audio or video by communicating with the Core-Network to reduce or downgrade the bandwidth of stopped media type.

Similarly, when the client intends to resume receiving of a particular media type, i.e., audio or video, from the server, the MCVideo User-Equipment sends Reception Resume Request to MCVideo server. As a part of sending the Reception Resume Response, MCVideo Server is adapted to communicate with the Core Network to upgrade bandwidth with respect to the resumed media-type and accordingly resume sending the media-packets of specific-media type, i.e., Audio or Video, to the client.

In another example, as also depicted with respect to FIG. 4, based on the network-condition and associated local-policy, the server itself is adapted to send Reception Hold and Resume Request. In one implementation, if the server discovers that any of the streams is extremely significant, as for example Emergency situation, and needs to be addressed by all the users, then the server (704) is adapted to force users to receive a Held stream by sending "Reception Resume" message. In another implementation, if the server discovers network congestion and there prevails the feasibility of transmitting audio stream only, then to disable the video content, the server voluntarily sends "Reception Hold" message.

FIG. 8 illustrates a method for controlling a single audio-video stream in Mission Critical Video (MCVideo). In an instance, when the bearer is allocated for audio, video and transmission and reception control (TRC), the MCVideo call is established and both audio and video streams are sent from MCVideo server (804) to MCVideo Client (802).

However, the bearer de-allocates any one of the streams, i.e., either audio or video stream, for example, when the reception hold-request is triggered. In that scenario, only the audio-stream is sent from the MCvideo server (804) to the MCVideo Client (802), thereby eventually disabling the video stream until further instructions, e.g. receipt of reception resume request to enable the video streaming. In such a scenario of resumption of the halted stream, the bearer is reallocated with respect to now resumed stream.

The TRC message and specific-fields in respect of the message in present FIG. 8 correspond to FIG. 12a and FIG. 12b.

FIG. 9a illustrates a method for controlling multiple audio-video streams in Mission Critical Video (MCVideo). The bandwidth allocation and the bearer are adapted to be modified depending upon the selectivity of multiple streams on the basis of request and response.

In an instance, when the bearer is allocated for audio, video and transmission and reception control (TRC), the MCVideo call is established and multiple audio and video streams are sent from MCVideo server (904) to MCVideo Client (902). However, when the reception hold-request is triggered for a selected stream then the bearer and band-width with respect to the selected stream are modified (i.e. downgraded). In that scenario, only the selected audio and videostreams is sent from the MCvideo server (904) to the MCVideo Client (902), thereby eventually disabling the remaining audio and video stream until further instructions, e.g. receipt of reception resume request to enable the halted audio and video streams. In such a scenario of resumption of the halted stream, the bearer and bandwidth are upgraded with respect to now resumed stream.

The TRC message and specific-fields in respect of the message in FIG. 9a correspond to FIG. 13a and FIG. 13b.

FIG. 9b illustrates a method for controlling single audio-video streams in Mission Critical Video (MCVideo), according to another embodiment of the present disclosure and corresponds to FIG. 8. However, while the TRC message and specific-fields in respect of the message in FIG. 8 correspond to FIGS. 12a and 12b, the TRC message and specific-fields in respect of the message in FIG. 9b correspond to FIG. 13a and FIG. 13b.

Likewise, while the TRC message and specific-fields in respect of the message in FIG. 9a correspond to FIGS. 12a and 12b FIG. 9a, the description of FIG. 9a may also be expanded to accommodate the TRC message and specific-fields corresponding to FIG. 13a and FIG. 13b.

FIG. 10 illustrates a call-flow representing MCVideo UE/Server initiated Reception Hold request, according to an embodiment of the present disclosure.

At step 6001, when the Reception Hold Request is initiated between MCVideo User Equipment and MCVideo AS, wherein the server is entrusted for streaming audio and video to the client. Accordingly, for said purposes, the allocation of the bearer may be treated as precondition.

Step 6002, Step 6003 and Step 6004 collectively depict signaling initiated from MCVideo AS to communicate through the bearer nodes, i.e. LTE Core and IMS core in order to enforce the reduction in bandwidth for audio or video stream while keeping TRC message unchanged.

The underlying protocol for said signalling may be state of the art signalling protocol between the MCVideo AS and the access network (i.e. LTE core and IMS core).

In response to the above-stated steps 6001-6004, the LTE Core sends acknowledgment response to MCVideo AS through IMS Core, as also depicted by steps Step 6005, Step 6006 and Step 6007. Further, as soon as the Reception Hold Request is triggered, the bearer bandwidth is downgraded for audio or video streams depending upon the Hold Request.

FIG. 11 illustrates a call-flow representing MCVideo UE/Server initiated Reception Resume Request, according to an embodiment of the present disclosure.

At step 7001, when the Reception Resume Request is initiated between MCVideo User Equipment and MCVideo AS, the bearer is allocated either for audio and video streams.

Step 7003 and Step 7004 collectively depict the signaling from MCVideo AS to LTE Core through IMS Core in order to enforce the up-gradation in bandwidth for audio or video stream.

In response to the above-stated steps 7001-7004, the LTE Core sends back the acknowledgment response to MCVideo AS through IMS Core, as also depicted by steps Step 7005, Step 7006 and Step 7007. Further, again as soon as the Reception Hold Request is triggered, the bearer bandwidth is upgraded for audio or video streams depending upon the Resume Request.

As may be understood, the Reception Control Message comprises Reception Hold Request & Reception Resume Request for controlling specific media type, i.e., Audio/Video, within MCVideo session. The Reception Hold Request and Reception Resume Request message are adapted to transmit from the transmission control participant to the transmission control server and vice versa. The Reception Control Message is processed as below:

When the client or the user doesn't want to receive a particular media type (i.e., Audio/Video) from the server, the Reception Hold Request is transmitted from the client end.
  When the server doesn't intend to forward a particular media type (Audio/Video) to the respective client, the Reception Hold Request is transmitted from the server.
  When the client intends to receive a particular media type (Audio/Video) from the server, the Reception Resume Request is transmitted from the client.

When the server intends to forward a particular media type (Audio/Video) to the respective client, the Reception Resume Request is transmitted from the server.

FIG. 12a and FIG. 12b illustrates an example TRC message(s) exchanged between server and client and correspond to the example signaling as depicted in FIG. 8, FIG. 10 and FIG. 11, according to an embodiment of the present disclosure. FIG. 12a and FIG. 12b represent content of the "Reception Hold/Resume Request" & "Reception Hold/Resume Response" message.

In an implementation, as shown in FIG. 12a, Reception Hold Request" & "Reception Resume Request" are reception control messages which will control specific media type [Audio/Video] within MCVideo session. The "Reception Hold Request" and "Reception Resume Request" message is sent from the transmission control participant 902 to the transmission control server 904 and from the transmission control server 904 to the transmission control participant 902.

The Reception Hold Request is sent from client 802 when client don't want to receive particular media type [Audio/Video] from server 804. The Reception Hold Request is sent from Server 804, when Server 804 don't want to forward particular media type [Audio/Video] to respective client 802. The Reception Resume Request is sent from client 802, when the client 802 want to receive particular media type [Audio/Video] from server 804. Reception Resume Request is sent from Server 804, when Server 804 want to forward particular media type [Audio/Video] to respective client 802.

In an implementation, as shown in FIG. 12b, "Reception Hold Response" & "Reception Resume Response" are sent in response "Reception Hold Request" and "Reception Resume Request" respectively. "Reception Hold Response" & "Reception Resume Response" are bi-directional messages i.e. sent from control participant to the transmission control server and vice versa.

In an example, the "Subtype" in the TRC message may be represented as follows
  Reception Hold Request: Subtype value "x0101"
  Reception Hold Response: Subtype value "x0110"
  Reception Resume Request: Subtype value "x0111"
  Reception Resume Response: Subtype value "x1000"

In further example, at least within some of TRC messages, the first bit (marked as "x" in the subtype) may be used to indicate if the sender wants to have an acknowledgment. The x is coded as follows:
  '0' Acknowledgment is not required
  '1' Acknowledgment is required FIG. 13a and FIG. 13b illustrates another example TRC message(s) exchanged between server and client and correspond to the example signaling as depicted in FIG. 9, FIG. 10 and FIG. 11, according to another embodiment of the present disclosure.

In an implementation, FIG. 13 illustrates a new TRC Message titled as "Reception Media Control Request" is proposed, which at least aims to preserve network-bandwidth consumed by unwanted or less important media streams [Audio/Video]. The "Reception Media Control Request" message is sent from the transmission control participant 902 to the transmission control server 904 and vice versa. The "Reception Media Control Request" is sent to modify specific media type.

"Media Type Indicator" message field indicates type of media to be controlled [Audio/Video] and further details have been depicted in FIG. 14a. "Media Action Type" message field indicates type of action [Stop/Start] to be taken on specific media type and has been further depicted in FIG. 14b.

Further, "Reception Media Control Response" is sent in response to "Reception Media Control Request" message. "Reception Media Control Response" is a bi-directional messages i.e. sent from control participant 902 to the transmission control server 904 and vice versa.

In an implementation, "Subtype" within respect to the TRC message may be defined as follows:
  Reception Media Control Request: Subtype value "x1001"
  Reception Media Control Response: Subtype value "x1010"

For some messages the first bit (marked as x in the subtype) can be used to indicate if the sender wants to have an acknowledgment. The x may be coded as follows:
  '0' Acknowledgment is not required
  '1' Acknowledgment is required FIG. 14 illustrates example specific fields in example TRC message(s) of FIG. 12 and FIG. 13, respectively, according to another embodiment of the present disclosure;

As shown in FIG. 14a, "Media Type Indicator" indicates type of media [Audio/Video] which user/server want to control. In an example, "Media Type Indicator Field Id" depicts that New Binary value may be be defined. The "Media Type Indicator Length" value is a binary value and has the value '2' indicating the total length in octets of the "Media Type Filed Id" value item. The "Media Type Indicator Value" value is binary and may be coded as follows:
  01 User/Server Want to Control Audio
  10 User/Server Want to Control Video.
  11 User/Server Want to Control both Audio, Video.

As shown in FIG. 14b, "Media Action Type Indicator" indicates type of action [stop/Start] to be taken on specific media type. In an example, as per "Media Action Type Field Id", New Binary value may be defined. The "Media Action Type Length" value is a binary value and has the value '2' indicating the total length in octets of the "Media Action Type Field Id" value item. "Media Action Type Value>" value is binary and may be coded as follows:
  00 Stop/Suspend Media—Type of which defined in Media Type Indicator
  01 Start/Resume Media—Type of which defined in Media Type Indicator FIG. 15 shows yet another exemplary implementation in accordance with the embodiment of the invention, and yet another typical hardware configuration of the system 600 in the form of a computer system 1200. The computer system 1200 can include a set of instructions that can be executed to cause the computer system 1200 to perform any one or more of the methods disclosed. The computer system 1200 may operate as a standalone device or may be connected, e.g., using a network, to other computer systems or peripheral devices.

In a networked deployment, the computer system 1200 may operate in the capacity of a server or as a client user computer in a server-client user network environment, or as a peer computer system in a peer-to-peer (or distributed) network environment. The computer system 1200 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 1200 is illustrated, the term "system" shall also be taken to include any collection of systems or sub-systems that individually or jointly execute a set, or multiple sets, of instructions to perform one or more computer functions.

The computer system 1200 may include a processor 1202 e.g., a central processing unit (CPU), a graphics processing unit (GPU), or both. The processor 1202 may be a component in a variety of systems. For example, the processor 1202 may be part of a standard personal computer or a workstation. The processor 1202 may be one or more general processors, digital signal processors, application-specific integrated circuits, field-programmable gate arrays, servers, networks, digital circuits, analog circuits, combinations thereof, or other now known or later developed devices for analysing and processing data. The processor 1202 may implement a software program, such as code generated manually (i.e., programmed).

The computer system 1200 may include a memory 1204, such as a memory 1204 that can communicate via a bus 1208. The memory 1204 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1204 includes a cache or random access memory for the processor 1202. In alternative examples, the memory 1204 is separate from the processor 1202, such as a cache memory of a processor, the system memory, or other memory. The memory 1204 may be an external storage device or database for storing data. The memory 1204 is operable to store instructions executable by the processor 1202. The functions, acts or tasks illustrated in the figures or described may be performed by the programmed processor 1202 for executing the instructions stored in the memory 1204. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 1200 may or may not further include a display unit 1210, such as a liquid crystal display (LCD), an organic light-emitting diode (OLED), a flat panel display, a solid-state display, a cathode ray tube (CRT), a projector, a printer or other now known or later developed display device for outputting determined information. The display 1210 may act as an interface for the user to see the functioning of the processor 1202, or specifically as an interface with the software stored in the memory 1204 or in the drive unit 1216.

Additionally, the computer system 1200 may include an input device 1212 configured to allow a user to interact with any of the components of system 1200. The computer system 1200 may also include a disk or optical drive unit 1216. The disk drive unit 1216 may include a computer-readable medium 1222 in which one or more sets of instructions 1224, e.g. software, can be embedded. Further, the instructions 1224 may embody one or more of the methods or logic as described. In a particular example, the instructions 1224 may reside completely, or at least partially, within the memory 1204 or within the processor 1202 during execution by the computer system 1200.

The present invention contemplates a computer-readable medium that includes instructions 1224 or receives and executes instructions 1224 responsive to a propagated signal so that a device connected to a network 1226 can communicate voice, video, audio, images or any other data over the network 1226. Further, the instructions 1224 may be transmitted or received over the network 1226 via a communication port or interface 1220 or using a bus 1208. The communication port or interface 1220 may be a part of the processor 1202 or may be a separate component. The communication port 1220 may be created in software or may be a physical connection in hardware. The communication port 1220 may be configured to connect with a network 1226, external media, the display 1210, or any other components in system 1200, or combinations thereof. The connection with the network 1226 may be a physical connection, such as a wired Ethernet connection or may be established wirelessly as discussed later. Likewise, the additional connections with other components of the system 1200 may be physical connections or may be established wirelessly. The network 1226 may alternatively be directly connected to the bus 1208.

The network 1226 may include wired networks, wireless networks, Ethernet AVB networks, or combinations thereof. The wireless network may be a cellular telephone network, an 802.11, 802.16, 802.20, 802.1Q or WiMax network. Further, the network 1226 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet-switched network transmission (e.g., TCP/IP, UDP/IP, HTML, HTTP) may be used.

At least by virtue of aforesaid, the present subject matter renders an effective bandwidth usage. For example, if the user is not interested in video and wants to receive only audio, he/she can disable video which will save bandwidth. Further, there is achieved Battery/Power Improvement. For example, if user is not interested in video and wants to receive only audio, he/she can disable video which in turn will save power as user don't have to receive & process video stream. Further, there is achieved better user experience. For example, if user receives audio from all other users, he might not be able to understand anything because of the noise. In the present case of the present subject matter, user can disable audio streams from all but one and continue to receive videos from all participants.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems and any component(s) that may cause any benefit, advantage, or solution to occur or become more pronounced are not to be construed as a critical, required, or essential feature or component of any or all the claims.

The invention claimed is:

1. A method for controlling streaming of multimedia data by a server in a network, the method comprising:
   receiving, from a client device, a first control message for requesting to selectively control at least one first media stream from among a plurality of media streams in multimedia data which is currently streamed by the client device, wherein the first control message comprises a media type indicator indicating at least one media type of the at least one first media stream to request to control, among a plurality of media types comprising an audio and a video;
   identifying, from the first control message, the at least one first media stream having the at least one media type which is indicated by the media type indicator in the first control message, and a type of control to be performed with respect to the at least one first media stream;
   responding to the client device based on the identified at least one first media stream and the identified type of control by suspending or resuming streaming of the at least one first media stream having the at least one media type which is indicated by the media type indicator in the first control message, from among the plurality of media streams in the multimedia data which is currently streamed by the client device;
   based on identifying a predetermined urgency of at least one second media stream from among the plurality of media streams in the multimedia data for which streaming to the client device is suspended:
      transmitting, to the client device, a second control message for requesting the client device to resume streaming of the at least one second media stream, wherein the second control message comprises a media type indicator indicating at least one media type of the at least one second media stream, among the plurality of media types; and
      resuming streaming of the at least one second media stream to the client device; and
   based on identifying a predetermined network congestion, for at least one third media stream from among the plurality of media streams in the multimedia data which is currently streamed by the client device:
      transmitting, to the client device, a third control message for requesting the client device to suspend streaming of the at least one third media stream, wherein the third control message comprises a media type indicator indicating at least one media type of the at least one third media stream, among the plurality of media types; and
      suspending streaming of the at least one third media stream;
   wherein a first value of a media type indicator indicates a request to control audio, a second value of the media type indicator indicates a request to control video, and a third value of the media type indicator indicates a request to control both audio and video; and
   wherein each of the first control message, the second control message, and the third control message further comprises a first field indicating length of a second field for the media type indicator, and a value of the first field depends on a number of media streams controlled.

2. The method of claim 1, wherein the plurality of media streams in the multimedia data comprises one or more of:
   an audio stream;
   a video stream;
   a text communication; or
   a flashwork.

3. The method of claim 1, wherein each of the first control message, the second control message, and the third control message comprises a Transmission Reception Control (TRC) message and is categorized as at least one of:
   a reception-hold message;
   a reception-resume message; or
   a single reception control command message for facilitating both reception-hold operation and reception-resume operation.

4. The method of claim 3, wherein each of the first control message, the second control message, and the third control message is further associated with a Transmission Reception Control (TRC) specific field and defined by at least one of:
   a media type defined by at least one of an audio, a video or a text; or
   an action defined by at least one of start operation or stop operation in respect of the corresponding at least one media stream.

5. The method of claim 1, wherein each of the first control message, the second control message, and the third control message is analyzed at a user-network interface (UNI) defining an interface between the client device and a bearer-network.

6. The method of claim 1, wherein the responding comprises at least one of:
   de-allocating a bearer-service with respect to the at least one first media stream; or
   downgrading a bearer-bandwidth associated with the at least one first media stream.

7. The method of claim 1, wherein the responding comprises at least one of:
   re-allocating a bearer-service with respect to the at least one first media stream; or
   upgrading a bearer-bandwidth associated with the at least one first media stream.

8. A method for controlling streaming of multimedia data by a server in a network, the method comprising:
   controlling a suspending or a resuming of streaming of at least one first media stream from among a plurality of media streams in multimedia data accessible to a client device based on a first control message received from the client device, the first control message comprising a media type indicator indicating at least one media type of the at least one first media stream to request to control, among a plurality of media types comprising audio and video;
   based on identifying a predetermined urgency of at least one second media stream from among the plurality of media streams in the multimedia data for which streaming to the client device is suspended:
      transmitting, to the client device, a second control message for requesting the client device to resume streaming of the at least one second media stream, wherein the second control message comprises a media type indicator indicating at least one media type of the at least one second media stream, among the plurality of media types; and resuming streaming of the at least one second media stream to the client device; and based on identifying a predetermined network congestion, for at least one third media stream from among the plurality of media streams in the multimedia data which is currently streamed by the client device:

transmitting, to the client device, a third control message for requesting the client device to suspend streaming of the at least one third media stream, wherein the third control message comprises a media type indicator indicating at least one media type of the at least one third media stream, among the plurality of media types; and suspending streaming of the at least one third media stream;

wherein a first value of a media type indicator indicates a request to control audio, a second value of the media type indicator indicates a request to control video, and a third value of the media type indicator indicates a request to control both audio and video; and wherein each of the first control message, the second control message, and the third control message further comprises a first field indicating length of a second field for the media type indicator, and a value of the first field depends on a number of media streams controlled.

9. A server for controlling streaming of multimedia data in a network, the server comprising:

a memory; and a processor coupled to the memory, wherein the processor is configured to:

receive, from a client device, a first control message for requesting to selectively control at least one first media stream from among a plurality of media streams in multimedia data which is currently streamed by the client device, wherein the first control message comprises a media type indicator indicating at least one media type of the at least one first media stream to request to control, among a plurality of media types comprising an audio and a video;

identify, from the first control message, the at least one first media stream having the at least one media type which is indicated by the media type indicator in the first control message, and a type of control to be performed with respect to the at least one first media stream;

respond to the client device based on the identified at least one first media stream and the identified type of control by suspending or resuming streaming of the at least one first media stream having the at least one media type which is indicated by the media type indicator in the first control message, from among the plurality of media streams in the multimedia data which is currently streamed by the client device;

based on identifying a predetermined urgency of at least one second media stream from among the plurality of media streams in the multimedia data for which streaming to the client device is suspended:

transmit, to the client device, a second control message for requesting the client device to resume streaming of the suspended at least one second media stream, wherein the second control message comprises a media type indicator indicating at least one media type of the at least one second media stream for which streaming is resumed, among the plurality of media types; and resume streaming of the at least one second media stream to the client device; and based on identifying a predetermined network congestion for at least one third media stream from among the plurality of media streams in the multimedia data which is currently streamed by the client device:

transmit, to the client device, a third control message for requesting the client device to suspend streaming of the at least one third media stream, wherein the third control message comprises a media type indicator indicating at least one media type of the at least one third media stream, among the plurality of media types; and suspend streaming of the at least one third media stream;

wherein a first value of a media type indicator indicates a request to control audio, a second value of the media type indicator indicates a request to control video, and a third value of the media type indicator indicates a request to control both audio and video; and wherein each of the first control message, the second control message, and the third control message further comprises a first field indicating length of a second field for the media type indicator, and a value of the first field depends on a number of media streams controlled.

10. The server of claim 9, wherein the plurality of media streams in the multimedia data comprises one or more of:

an audio stream;

a video stream;

a text communication; or a flashwork.

11. The server of claim 9, wherein each of the first control message, the second control message, and the third control message comprises a Transmission Reception Control (TRC) message and is categorized as at least one of:

a reception-hold message;

a reception-resume message; or a single reception control command message for facilitating both reception-hold operation and reception-resume operation.

12. A server for controlling streaming of multimedia data in a network, the server comprising:

a memory; and a processor coupled to the memory, wherein the processor is configured to:

control a suspending or a resuming of streaming of at least one first media stream from among a plurality of media streams in multimedia data accessible to a client device based on a first control message received from the client device, the first control message comprising a media type indicator indicating at least one media type of the at least one first media stream to request to control, among a plurality of media types comprising audio and video;

based on identifying a predetermined urgency of at least one second media stream from among the plurality of media streams in the multimedia data for which streaming to the client device is suspended;

transmit, to the client device, a second control message for requesting the client device to resume streaming of the at least one second media stream, wherein the second control message comprises a media type indicator indicating at least one media type of the at least one second media stream, among the plurality of media types; and resume streaming of the at least one second media stream to the client device; and based on identifying a predetermined network congestion for at least one third media stream from among the plurality of media streams in the multimedia data which is currently streamed by the client device:

transmit, to the client device, a third control message for requesting the client device to suspend streaming of the at least one third media stream, wherein the third control message comprises a media type indicator indicating at least one media type of the at least one third media stream, among the plurality of media types; and suspend streaming of the at least one third media stream;

wherein a first value of a media type indicator indicates a request to control audio, a second value of the media type indicator indicates a request to control video, and a third value of the media type indicator indicates a request to control both audio and video; and wherein each of the first control message, the second control message, and the third control message further comprises a first field indicating length of a second field for the media type indicator, and a value of the first field depends on a number of media streams controlled.

* * * * *